(12) United States Patent
Ito et al.

(10) Patent No.: US 7,267,410 B2
(45) Date of Patent: Sep. 11, 2007

(54) BALANCE WEIGHT AND BALANCE-CORRECTING STRUCTURE FOR SPOKE WHEEL

(75) Inventors: Shinji Ito, Saitama (JP); Yutaka Yamaguchi, Aichi (JP)

(73) Assignees: Honda Motor Co., Ltd., Tokyo (JP); Toho Kogyo Co., Ltd., Aichi (JP)

( * ) Notice: Subject to any disclaimer, the term of this patent is extended or adjusted under 35 U.S.C. 154(b) by 0 days.

(21) Appl. No.: 10/932,880

(22) Filed: Sep. 2, 2004

(65) Prior Publication Data
US 2005/0110331 A1 May 26, 2005

(30) Foreign Application Priority Data
Sep. 9, 2003 (JP) .............................. 2003-317459

(51) Int. Cl.
*F16F 15/32* (2006.01)
(52) U.S. Cl. .................. 301/5.21; 301/37.41
(58) Field of Classification Search ............... 301/5.21, 301/37.41
See application file for complete search history.

(56) References Cited

U.S. PATENT DOCUMENTS

| | | | |
|---|---|---|---|
| 131,782 A | * | 10/1872 | Randall ................. 74/571.11 |
| 2,269,670 A | * | 1/1942 | Kieckbusch ................ 301/5.21 |
| 4,906,050 A | * | 3/1990 | Soder et al. ............. 301/37.41 |
| 6,488,341 B2 | * | 12/2002 | Maruyama et al. ........ 301/5.21 |
| 6,588,852 B2 | * | 7/2003 | Mason ................... 301/37.41 |

FOREIGN PATENT DOCUMENTS

| | | |
|---|---|---|
| JP | 2002-089628 | 3/2002 |
| JP | 2002-174299 | 6/2002 |
| JP | 2002-257197 | 9/2002 |

\* cited by examiner

*Primary Examiner*—Russell D. Stormer
(74) *Attorney, Agent, or Firm*—Carrier, Blackman & Associates, P.C.; Joseph P. Carrier; William D. Blackman

(57) ABSTRACT

A balance weight is formed into a columnar shape to extend in an axial direction of a spoke connecting a wheel hub and a rim of a spoke wheel, has an insertion recess extending over its entire axial length to open in its outer periphery, and is secured by crimping to the spoke to surround the spoke inserted into the insertion recess. A reduced section having a decreased outer diameter is provided on the balance weight at an end facing toward the wheel hub. Thus, the balance weights can be mounted to the adjacent spokes of the spoke wheel without interference therebetween.

7 Claims, 10 Drawing Sheets

BALANCE WEIGHT AND BALANCE-CORRECTING STRUCTURE FOR SPOKE WHEEL

CROSS-REFERENCE TO RELATED APPLICATIONS

The present invention claims priority under 35 USC 119 based on Japanese patent application No. 2003-317459, filed September 9, the entire content of which is incorporated by reference herein.

BACKGROUND OF THE INVENTION

1. Field of the Invention

The present invention relates to a balance weight adapted to be secured by crimping to a spoke connecting a wheel hub and a rim of a spoke wheel, as well as a balance-correcting structure for a spoke wheel in which balance weights are individually mounted to rim-side ends of at least adjacent two of a plurality of spokes of the spoke wheel in order to correct the balance of rotation of the spoke wheel.

2. Description of the Related Art

Japanese Patent Application Laid-open No. 2002-89628 discloses a conventional balance weight and a balance-correcting structure for a spoke wheel.

The conventional balance weight is formed into a columnar shape to extend in an axial direction of a spoke, and has an insertion recess provided over its entire length to open in its outer periphery. The balance weight is secured by crimping to the spoke to surround the spoke inserted into the insertion recess. A plurality of spokes of the spoke wheel are disposed so that the spokes adjacent to each other in a circumferential direction of a rim intersect each other in the vicinity of the rim. When the number of the spokes is increased, the distance between the adjacent spokes is decreased. In this case, when the conventional balance weights are mounted on the spokes at ends on the side of the rim, interference occurs between the balance weights. As a result, it is difficult to mount the balance weights to the spokes, and the number of the spokes of the spoke wheel to which the balance weights can be mounted is limited.

SUMMARY OF THE INVENTION

Accordingly, it is an object of the present invention to provide a balance weight capable of being mounted to adjacent spokes of a spoke wheel while avoiding the interference between the balance weights, and a balance-correcting structure for a spoke wheel in which the balance weights can be mounted to adjacent spokes, wherein the degree of freedom in setting of the number of spokes is increased.

To achieve the above object, according to a first feature of the present invention, there is provided a balance weight which is formed into a columnar shape to extend in an axial direction of a spoke connecting a wheel hub and a rim of a spoke wheel, which has an insertion recess extending over its axially entire length to open in its outer periphery, and which is secured by crimping to the spoke to surround the spoke inserted into the insertion recess, wherein a reduced section having a decreased diameter is provided on the balance weight at an end on the side of or facing toward the wheel hub.

According to a second feature of the present invention, in addition to the first feature, the reduced section has a complete circular cross-section which decreases in the axial direction.

According to a third feature of the present invention, in addition to the first or second feature, the balance weight is made of tin or a tin alloy.

According to a fourth feature of the present invention, there is provided a balance-correcting structure for a spoke wheel which comprises a wheel hub into which an axle is inserted, and a rim on an outer periphery of which a tire is mounted, the wheel hub and the rim being connected to each other by a plurality of spokes which are disposed so that the spokes adjacent to each other in a circumferential direction of the rim intersect or cross over each other, the structure comprising columnar-shaped balance weights individually mounted to the rim-side ends of at least an adjacent two of the spokes to extend in an axial direction of the spokes, wherein a reduced section having a decreased outer diameter is provided on each of the balance weights mounted to the adjacent spokes at an end of the spoke at which the balance weights are closest to each other in order to avoid contact between the balance weights.

With the first feature of the present invention, the reduced section having the decreased outer diameter is provided on the columnar balance weight at its end facing the wheel hub. Therefore, even if the distance between the adjacent spokes is decreased due to a large number of the spokes of the spoke wheel, the balance weights can be mounted to the adjacent spokes while avoiding the interference between the balance weights.

With the second feature of the present invention, the reduced section is formed over the entire circumference of the balance weight. Therefore, it is unnecessary to determine the circumferential relative position of the balance weight with respect to the spoke, and moreover the reduced section is easily formed by machining.

With the third feature of the present invention, the balance weight is made of tin or a tin alloy thereby preventing electrolytic corrosion from generating in spokes when the spokes are made of iron. Moreover, because tin and a tin alloy are soft, it is easy to crimp the balance weight thereby facilitating the mounting of the balance weight to the spoke.

With the fourth feature of the present invention, in the case where the balance weights are individually mounted to the rim-side ends of at least an adjacent two of the plurality of spokes of the spoke wheel, the reduced section having the decreased outer diameter is provided on each of the balance weights mounted to the adjacent spokes at spoke ends at which the balance weights are closest to each other. Therefore, even if the number of the spokes is increased, the balance weights can be mounted to the adjacent spokes while avoiding the interference between the balance weights, and thus the degree of freedom in setting of the number of the spokes can be increased.

The above and other objects, features and advantages of the invention will become apparent from the following description of the preferred embodiment taken in conjunction with the accompanying drawings. It should be understood, however, that the detailed description of a specific example, while indicating the present embodiment of the invention, is given by way of illustration and not of limitation. Many changes and modifications may be made within the scope of the present invention without departing from the spirit thereof, and the invention includes all such modifications.

DESCRIPTION OF THE PRESENT EMBODIMENT

The present invention will now be described by way of an embodiment shown in the accompanying drawings.

Figure 1:
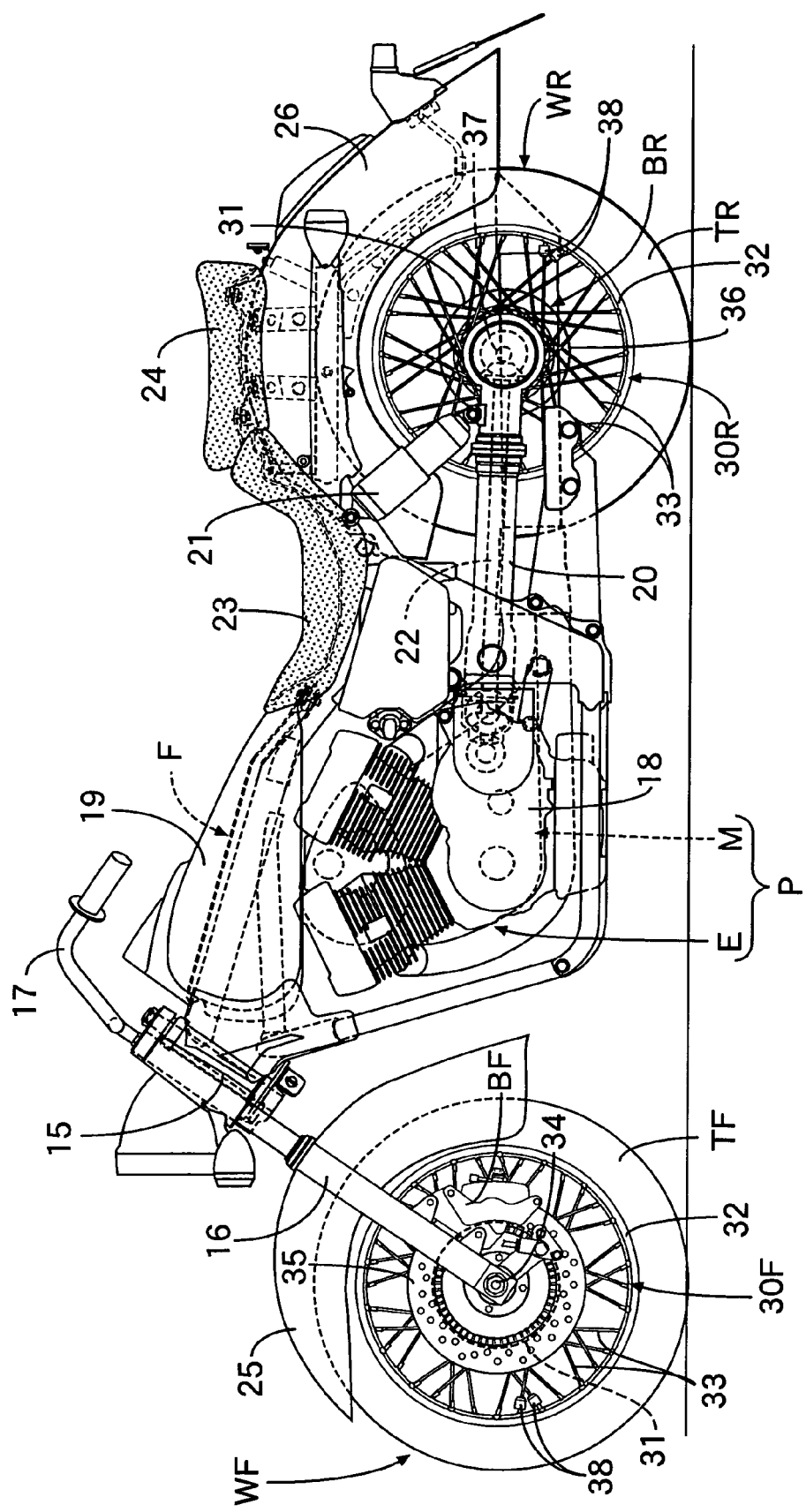
FIG. 1 is a left side view of a motorcycle provided with balance weights according to an embodiment of the invention.

Referring first to FIG. 1, a front fork 16 for supporting a front wheel WF is steerably carried on a head pipe 15 provided at a front end of a vehicle body frame F of a motor cycle. A steering handlebar 17 is connected to the front fork 16. A power unit P including, for example, a V-shaped engine E and a transmission M accommodated in a crankcase 18 of the engine E, is mounted at a front portion of the vehicle body frame F. A fuel tank 19 is mounted at the front portion of the vehicle body frame F so as to cover the engine E from above.

A pair of longitudinally extending left and right swinging arms 20 are swingably carried at their front ends on the vehicle body frame F in the rear of the power unit P, to hold therebetween a rear wheel WR with an axle. Rear cushion units 21 are interposed between the vehicle body frame F and rear ends of the swinging arms 20, respectively. Moreover, left one of the swinging arms 20 is formed into a cylindrical shape, thereby accommodating therein a driving shaft 22 for transmitting a power from the power unit P to a rear wheel WR.

A main seat 23 on which a rider can sit is mounted to the vehicle body frame F in the rear of the fuel tank 19. A pillion seat 24 for a tandem rider is mounted to the vehicle body frame F in the rear of the main seat 23.

A front fender 25 for covering from above the front wheel WF is mounted to the front fork 16. A rear fender 26 for covering from above the rear wheel WR is mounted to a rear portion of the vehicle body frame F.

The front wheel WF comprises a tire TF mounted on a spoke wheel 30F. The spoke wheel 30F comprises a wheel hub 31 into which an axle 34 rotatably carried at a lower end of the front fork 16 is coaxially inserted, and a rim 32 around an outer periphery of which the tire TF is mounted. The wheel hub 31 and the rim 32 are connected to each other by a plurality of spokes 33. The spokes 33 are disposed so that some of the spokes adjacent to each other in a circumferential direction of the rim 32 intersect or cross over each other in an x-shape. A brake disk 35 of a disk brake BF is mounted to the wheel hub 31 of the front wheel WF. The rear wheel WR comprises a tire TR mounted on a spoke wheel 30R, as in the front wheel WF. An axle 37 rotatably carried at rear ends of the swinging arms 20 and receiving power transmitted from the driving shaft 22 is coaxially inserted into and fixed to a wheel hub 31 of the spoke wheel 30R. A brake disk 36 of a disk brake BR is mounted to the wheel hub 31.

In order to correct the balance of rotation of the spoke wheel 30F in the front wheel WF, balance weights 38, 38 are individually mounted on at least an adjacent two 33, 33 of the spokes, in this embodiment, at ends on the side of or close to the rim 32.

Figure 2:
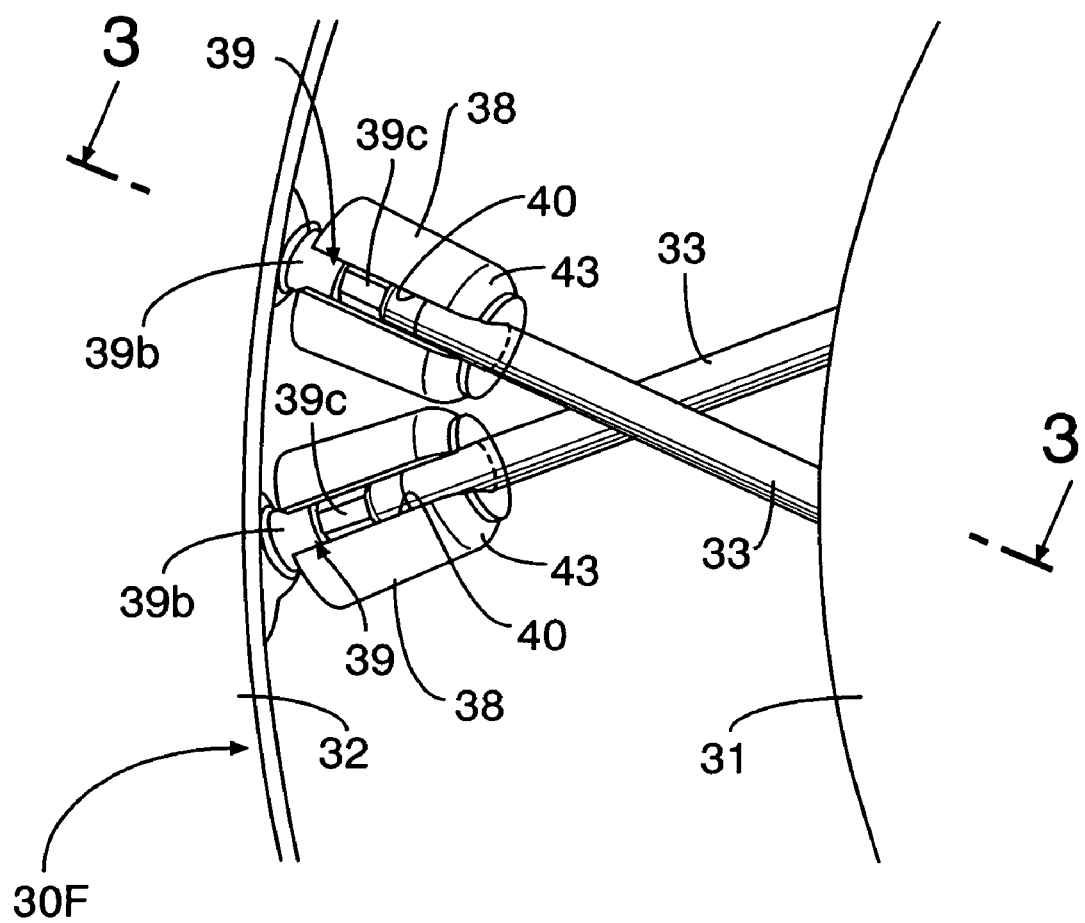
FIG. 2 is an enlarged view of essential portions, including the balance weights, of FIG. 1.
Figure 3:
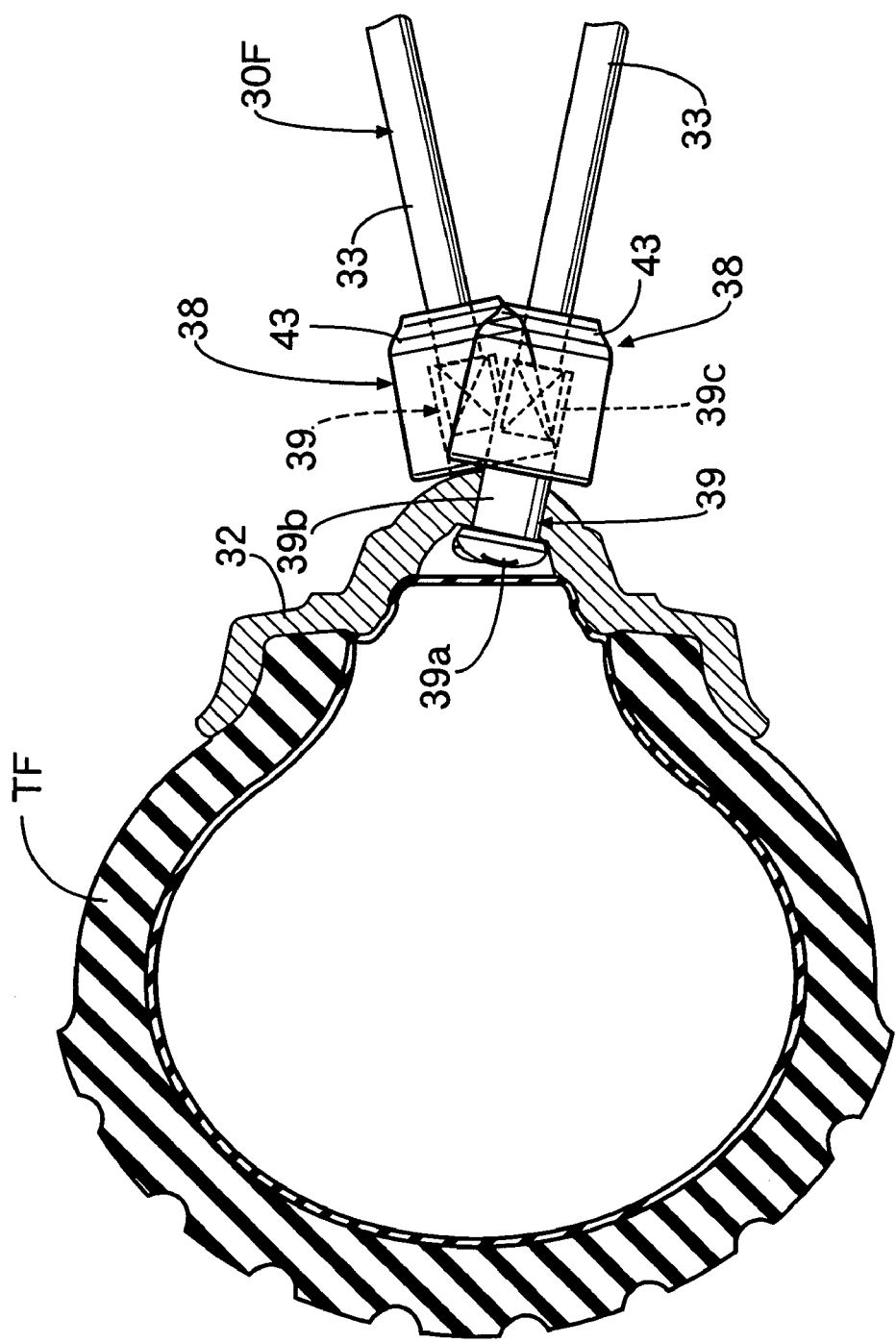
FIG. 3 is a sectional view taken along a line 3-3 in FIG. 2.

Referring to FIGS. 2 and 3, in the front wheel WF, a nipple 39 is threadedly engaged with each spoke 33 of the spoke wheel 30F at an end on the side of the rim 32, so that each spoke 33 is connected to the rim 32 through the nipple 39. Specifically, the nipple 39 includes an enlarged engagement portion 39a engaged over an outer periphery of the rim 32, a shaft portion 39b extending through the rim 32 and integrally leading to the enlarged engagement portion 39a, and a tool-locking portion 39c integrally leading to the shaft portion 39b. The cross-section of an outer surface of the shaft portion 39b is formed into a circular shape, and the cross-section of an outer surface of the tool-locking portion 39c is formed into a substantially quadrilateral shape capable of engaging with a tool such that the nipple may be rotated using the tool.

The two spokes 33, 33 adjacent to each other in the circumferential direction of the rim 32 are threadedly engaged with the nipples 39 to intersect each other at a location close to the rim 32. The balance weight 38 is mounted to the spoke 33 so that a portion of the nipple 39 protruding inwards from the rim 32 is surrounded by a portion of the balance weight 38.

Figure 4:
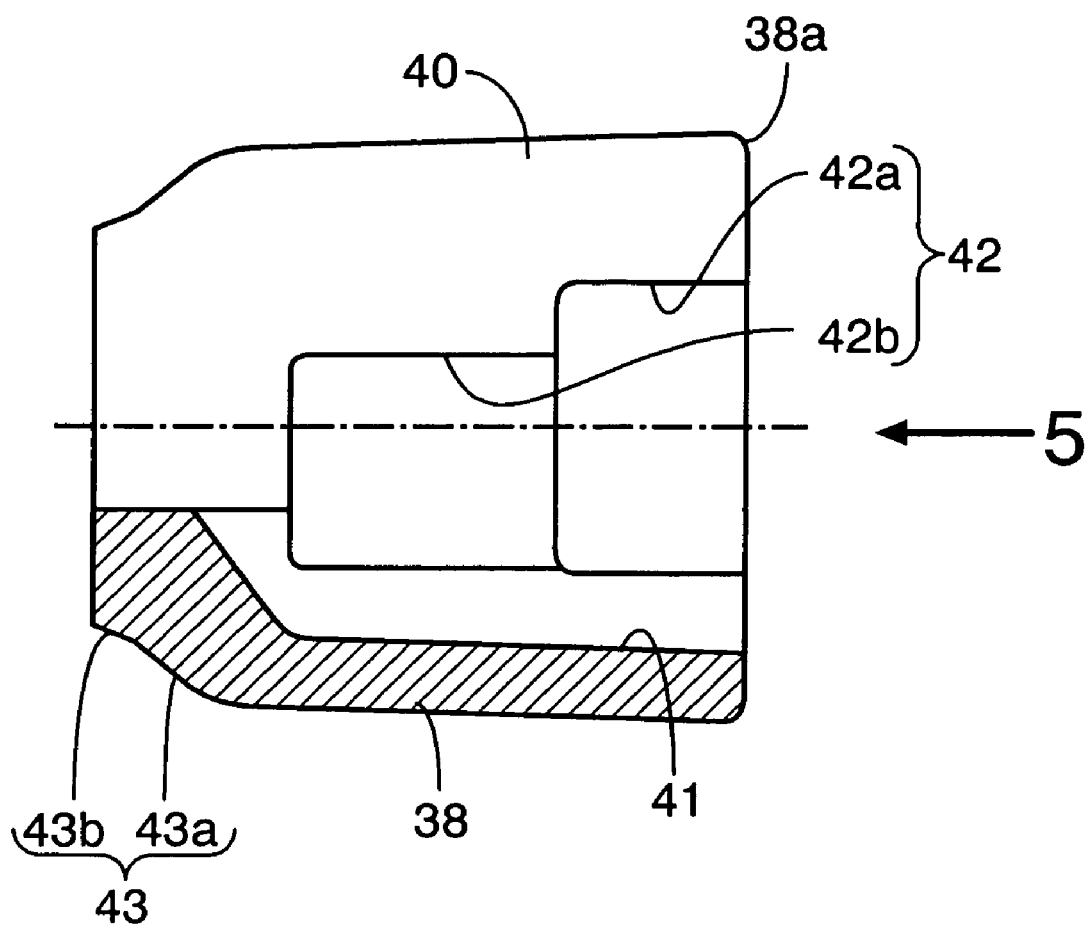
FIG. 4 is a vertical sectional view of a balance weight according to the embodiment of the invention taken along a line 4-4 in FIG. 5.
Figure 5:
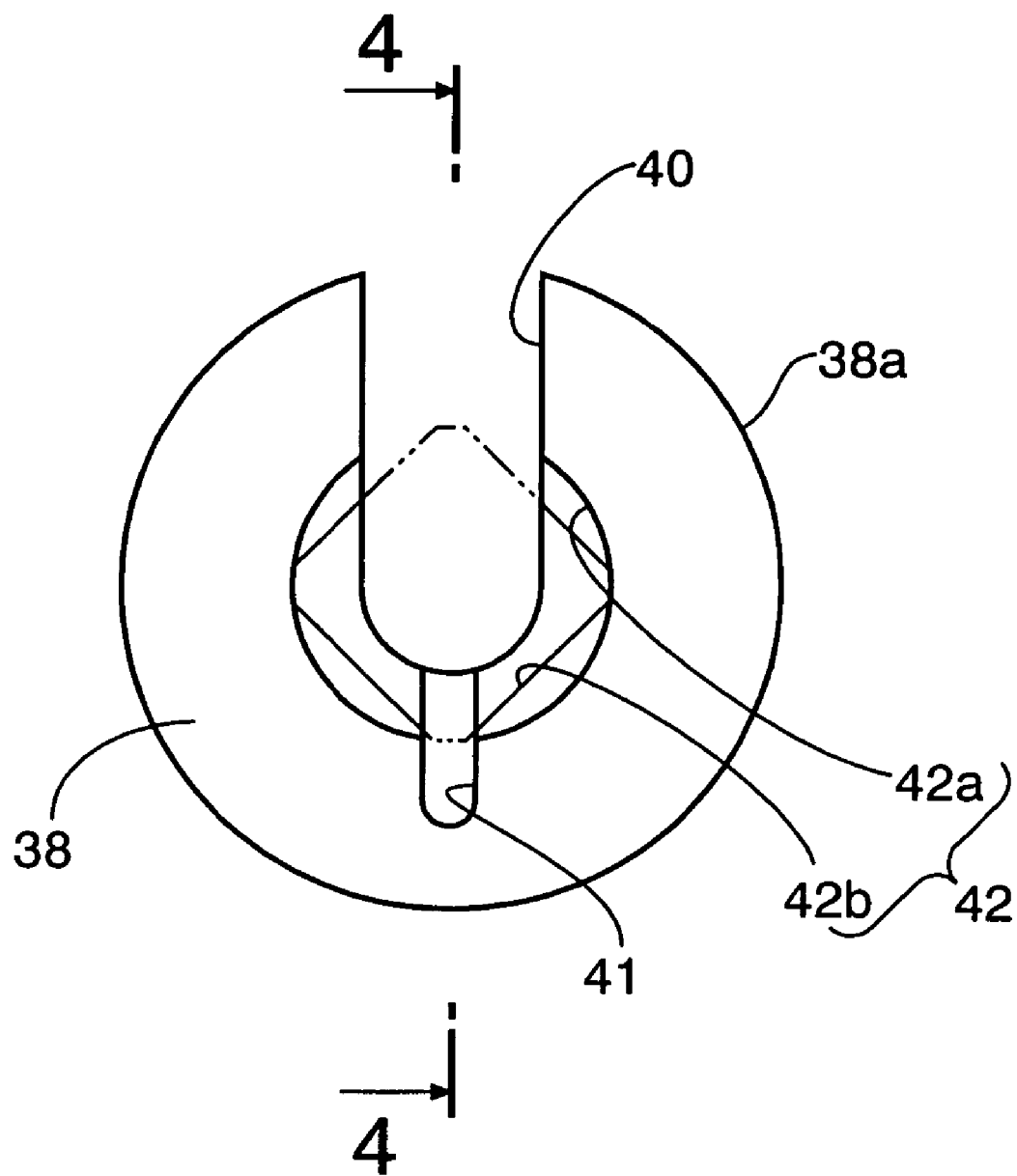
FIG. 5 is a view taken in a direction of an arrow 5 in FIG. 4.

Referring to FIGS. 4 and 5, the balance weight 38 is formed by casting from tin or a tin alloy into a columnar shape which may extend in an axial direction of the spoke 33. In this embodiment, the balance weight 38 is formed into a circular columnar shape, but may otherwise be formed into a truncated conical shape, for example. An insertion recess 40 is provided in the balance weight 38 over its axially entire length to open in its outer periphery so that the spoke 33 can be inserted into the insertion recess 40. A groove 41 is provided in an inner surface of the balance weight 38 to axially extend so as to oppose to an end of the insertion recess 40 opening in the outer periphery of the balance weight 38. Moreover, the groove 41 is formed so that one end thereof opens into one end of the balance weight 38 on the side facing the rim 32, but the other end thereof is closed by an intermediate portion of the balance weight 38 closer to the other end thereof in an axial direction.

The balance weight 38 is provided with a nipple-insertion bore 42 into which the nipple 39 is inserted. The nipple-insertion bore 42 comprises a circular bore portion 42a into which the shaft portion 39b of the nipple 39 is inserted corresponding to a portion of the nipple 39 protruding from the rim 32, and a square bore portion 42b into which the tool-locking portion 39c of the nipple 39 is inserted.

Further, according to the present invention, a reduced section 43 having a decreased diameter is provided on the balance weight 38 at a second end facing toward the wheel hub 31, i.e., at the other end. In this embodiment, the reduced section 43 is formed to have an outer diameter which is uniformly circular in cross-section around the entire circumference of the section and decreases in diameter in the axial direction by providing a tapered portion 43a having a diameter decreasing toward the wheel hub 31, and a substantially cylindrical portion 43b leading to a smaller-diameter end of the tapered portion 43a. The reduced section 43 is provided at the other end of the balance weight 38 with a length, for example, ¼ of the entire axial length of the balance weight 38. As will be understood from FIGS. 2-4, the balance weight 38 also includes a main body portion and a rounded corner portion disposed between the reduced section 43 and the main body portion. The main body portion has a tapered shape with an outer diameter decreased toward the wheel hub and configured such that a taper of the main body portion is smaller than that of the tapered portion of the reduced section.

The wall thickness of the balance weight 38 is determined in consideration of facilitation of crimping. An outer peripheral edge of the balance weight 38 closer to the rim 32 is formed as a curved portion 38a in order to avoid damage to the rim 32.

Such a balance weight 38 is secured by crimping to the spoke 33 so as to surround the spoke 33 inserted into the insertion recess 40 and the nipple 39. With the groove 41 provided in the inner surface of the balance weight 38, the balance weight 38 can be easily crimped when being attached to the spoke and nipple so as to narrow the width of the insertion recess 40.

Also in the spoke wheel 30R of the rear wheel WR, a pair of balance weights 38, 38 are mounted, as in the front wheel WF.

Figure 6:
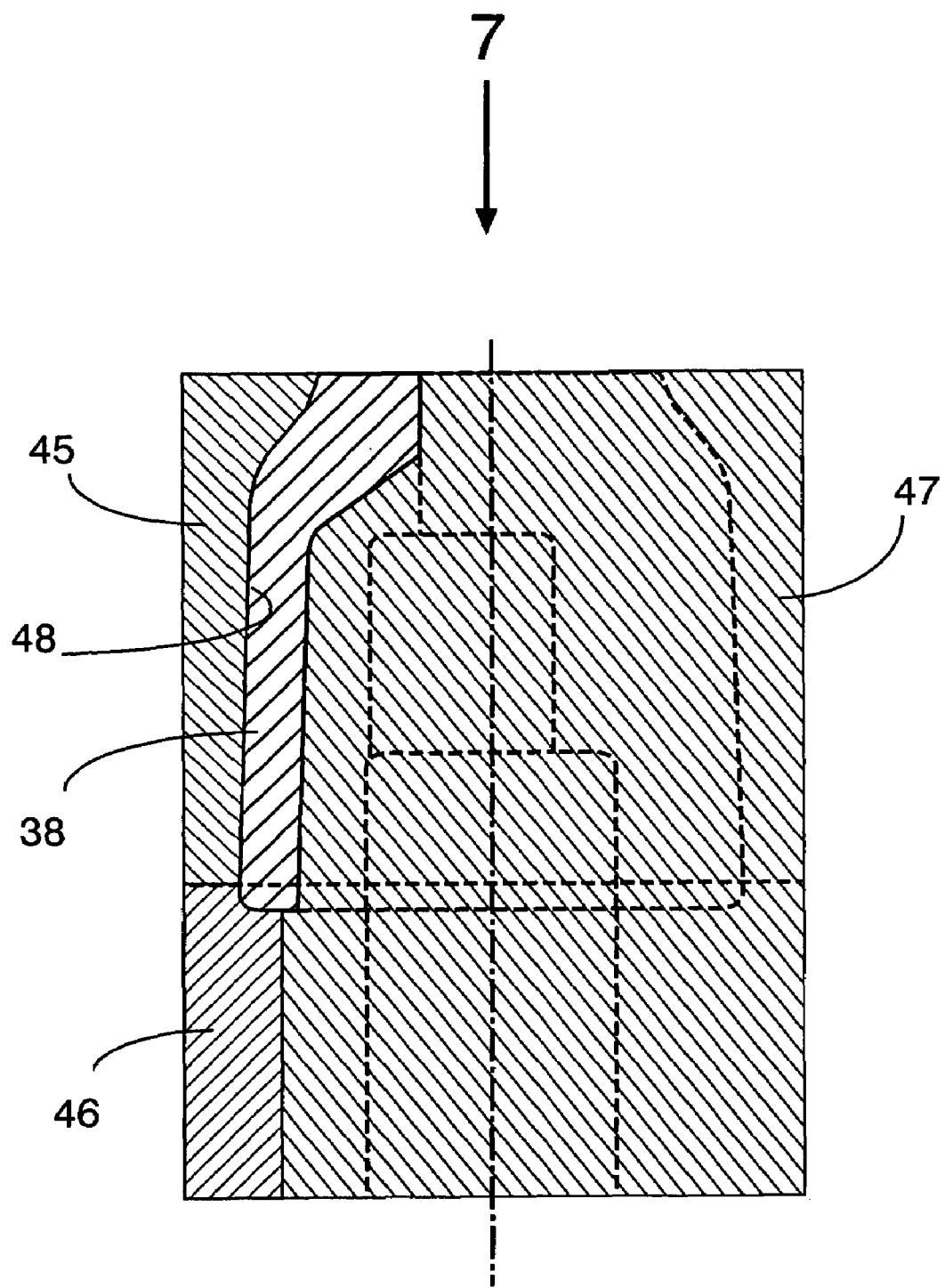
FIG. 6 is a vertical sectional view of a die system for forming the balance weight.
Figure 7:
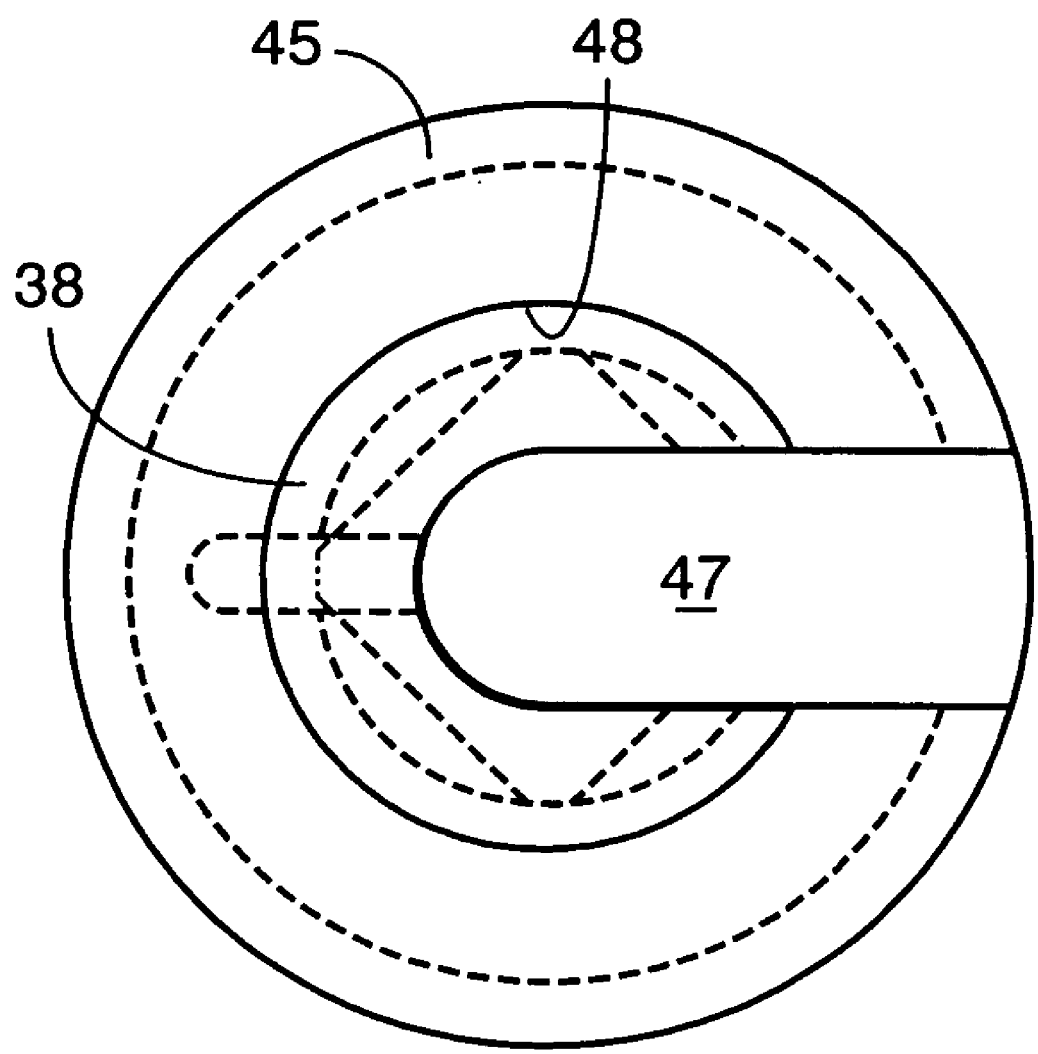
FIG. 7 is a view taken in a direction of an arrow 7 in FIG. 6.

Referring to FIGS. 6 and 7, a die system for forming by casing the balance weight 38 comprises an upper die 45, a lower die 46 and a slide core 47 which can be connected to and disconnected from one another. The balance weight 38 is formed by charging a molten metal of tin or a tin alloy into a cavity formed by cooperation among the upper and lower dies 45 and 46 and the slide core 47 which are in a connected state.

Figure 8:
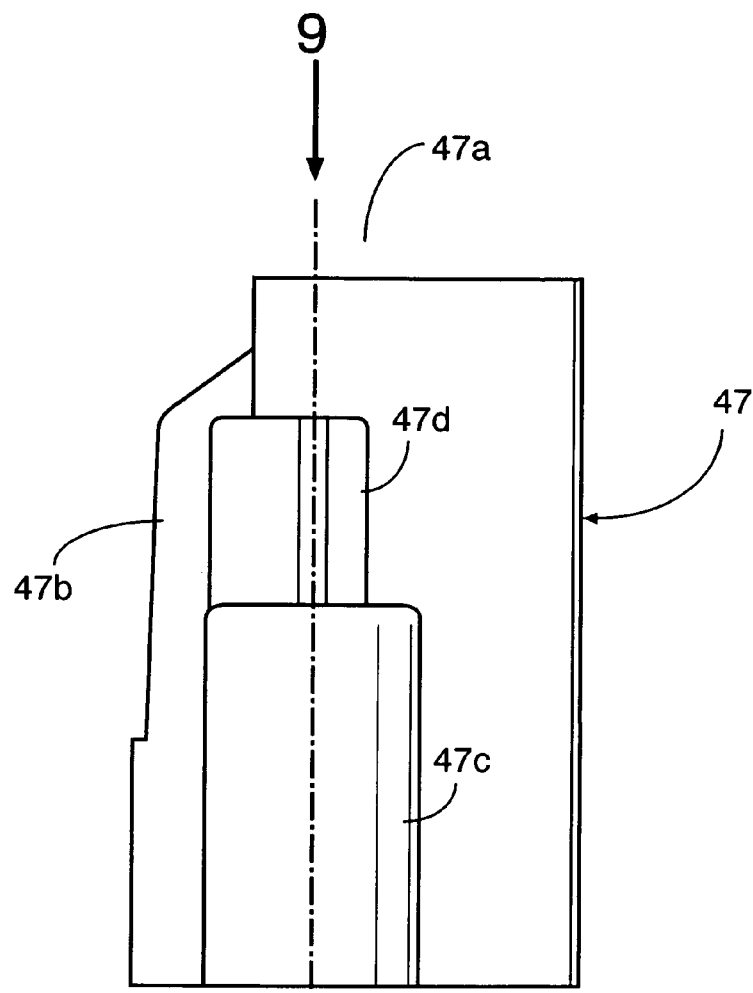
FIG. 8 is a side view of a slide core of the die system.
Figure 9:
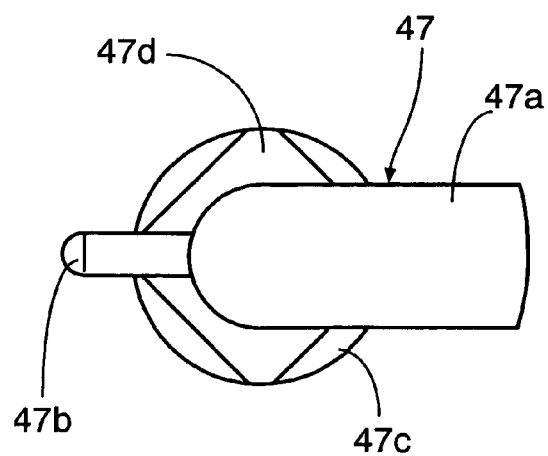
FIG. 9 is a view taken in a direction of an arrow 9 in FIG. 8.

The slide core 47 has an outer surface shape corresponding to an inner surface shape of the balance weight 38, as shown in FIGS. 8 and 9. The slide core 47 is integrally provided with a main core portion 47a extending into a flat-plate shape in order to form the insertion recess 40, a groove-forming portion 47b protruding into a rib-shape from the main core portion 47a in order to form the groove 41, and a circular overhanging portion 47c and a square overhanging portion 47d which overhang to opposite sides from the main core portion 47a and the groove-forming portion 47b in order to form the circular bore portion 42a and the square bore portion 42b of the nipple-insertion bore 42, respectively.

Figure 10:
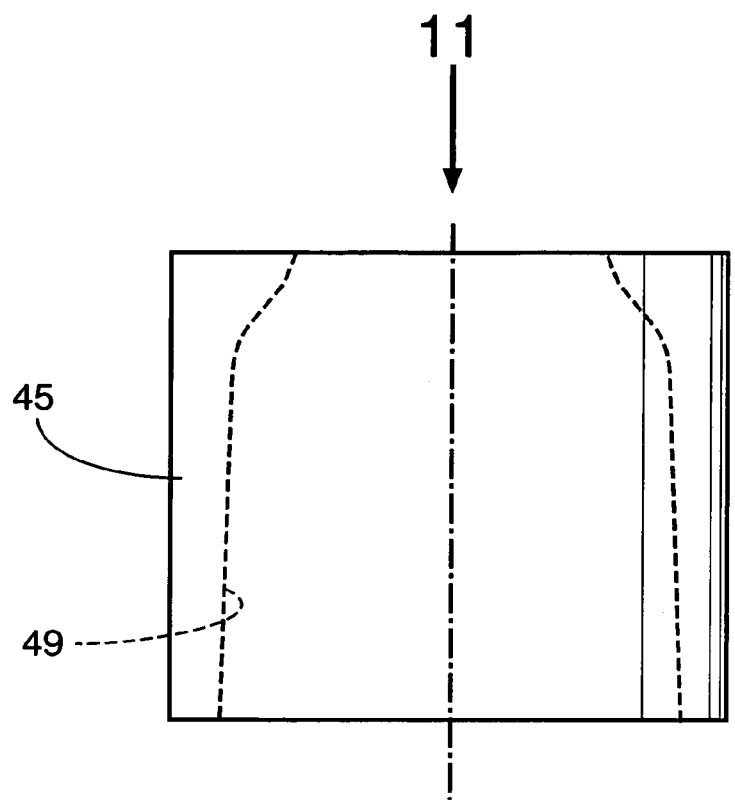
FIG. 10 is a side view of an upper die of the die system.
Figure 11:
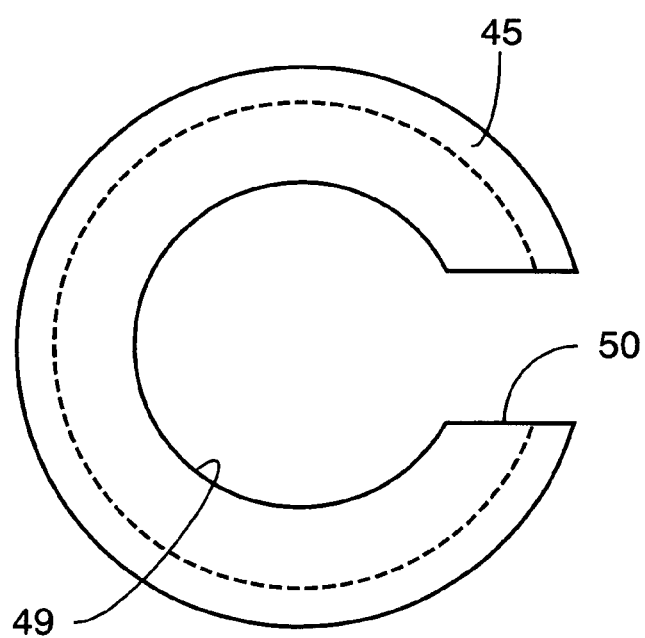
FIG. 11 is a view taken in a direction of an arrow 11 in FIG. 10.

The upper die 45 is formed into a substantially cylindrical shape, as shown in FIGS. 10 and 11, and provided with an outer peripheral-surface forming bore 49 having an inner peripheral surface corresponding to the outer peripheral surface of the balance weight 38, and a slit 50 leading to the outer peripheral-surface forming bore 49 in such a manner that an upper portion of the main core portion 47a of the slide core 47 is fitted into the slit 50.

Figure 12:
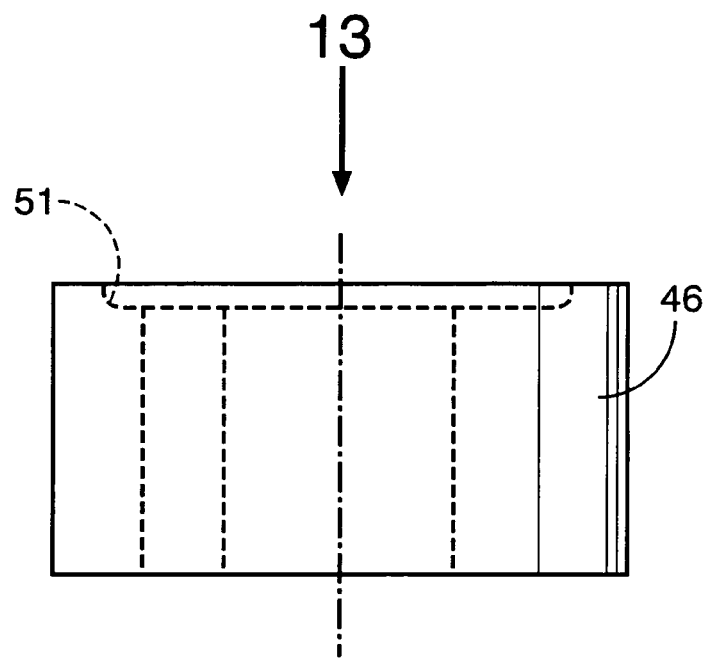
FIG. 12 is a side view of a lower die of the die system.
Figure 13:
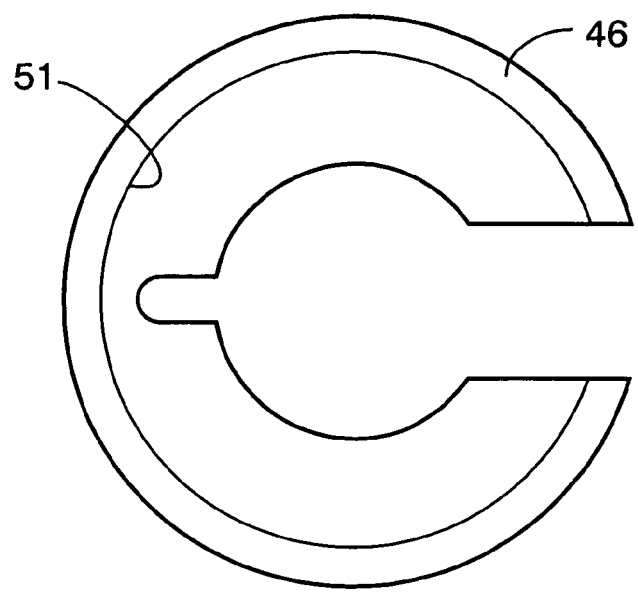
FIG. 13 is a view taken in a direction of an arrow 13 in FIG. 12.

The lower die 46 is formed into a substantially cylindrical shape, as shown in FIGS. 12 and 13, so that a lower portion of the slide core 47 can be fitted into the lower die 46, and has a recess 51 which is formed on its upper surface and which corresponds to the end of the balance weight 38 on the side of the rim 32.

The operation of this embodiment will be described below. The reduced section 43 having the decreased diameter is provided at the end of the balance weight 38 closer to the wheel hub 31, and hence even if the distance between the adjacent spokes 33, 33 is decreased due to a large number of the spokes of each of the spoke wheels 30F and 30R, the balance weights 38, 38 can be mounted to the adjacent spokes in such a manner that the reduced sections 43, 43 are disposed at locations where the balance weights are closest, while avoiding the interference between the balance weights 38, 38.

Moreover, the reduced section 43 is formed so that it has the same or uniform outer diameter completely around the circumference of the section at any given location along the axial direction, and hence it is unnecessary to determine the circumferential relative position of the balance weight 38 with respect to the spoke 33 and to pay attention to the circumferential relative position of the balance weight 38 when the balance weight 38 is mounted to the spoke 33. In this embodiment, the reduced section 43 is formed simultaneously with casting of the balance weight 38, but the reduced portion 43 may be formed by machining on an existing balance weight 38. In this case, machining is easy because the reduced section 43 is formed over the entire periphery of the balance weight 38.

In addition, in this embodiment, the reduced section 43 includes the tapered portion 43a and the substantially cylindrical portion 43b leading to the smaller-diameter end of the tapered portion 43a, and thus the upper end edge of the upper die 45 of the die system for forming by casting the balance weight 38, which corresponds to the shape of the outer peripheral surface of the reduced section 43, is not sharpened, thereby contributing to improvement in life of the upper die 45. Further, a change in shape of the reduced section 43 is present at its intermediate portion, and hence it is possible to ensure that a position to be crimped in the balance weight 38 is not displaced. As such, a calking jig for crimping the balance weight 38 may be easily prepared so as to crimp the balance weight 38 by using the reduced section 43 as a crimping reference position.

Further, because the balance weight 38 is made of tin or tin alloy, an electrolytic corrosion can be prevented from generating in spokes when the spokes are made of iron. Furthermore, because the tin and the tin alloy are soft, it is easy to crimp the balance weight thereby facilitating the mounting of the balance weight 38 to the spoke 33.

In order to correct the balance of rotation of the spoke wheels 30F and 30R of the front wheel WF and the rear wheel WR, the balance weights 38, 38 are mounted to at least adjacent two of the spokes 33 of each of the spoke wheels 30F and 30R, in this embodiment, at ends on the side of the rim 32. Further, the reduced sections 43 having the decreased diameter to avoid the contact between the balance weights 38, 38 are provided on the balance weights 38, 38 at the ends at which the balance weights are closest to each other. Therefore, even if the number of the spokes of each of the spoke wheels 30F and 30R is increased, the balance weights 38, 38 can be mounted to the adjacent spokes 33, 33, while avoiding the interference between the balance weights 38, 38, and the degree of freedom of setting of the number of the spokes can be increased.

Again, the present embodiment of the invention has been described in detail, it will be understood that the present invention is not limited to the above-described embodiment, and various modifications in design may be made without departing from the subject matter of the invention defined in the claims.

What is claimed is:

1. A balance weight formed into a substantially columnar shape to extend in an axial direction of a spoke connecting a wheel hub and a rim of a spoke wheel, said balance weight comprising:
   a weight body having an insertion recess extending over its entire axial length to open in its outer periphery, whereby the balance weight is adapted to be secured by crimping to the spoke so as to surround the spoke inserted into the insertion recess, and
   a reduced section having a decreased diameter at an end of the balance weight facing toward the wheel hub when crimped to the spoke;
   wherein the reduced section has a length which is approximately one quarter of the entire axial length of the balance weight, and
   wherein the reduced section includes a tapered portion and a substantially cylindrical portion leading to a smaller-diameter end of the tapered portion;
   wherein the balance weight also comprises a main body portion and a rounded corner portion disposed between the reduced section and the main body portion, and said main body portion has a tapered shape with an outer diameter decreased toward the wheel hub and configured such that a taper of the main body portion is smaller than that of the tapered portion of the reduced section.

2. A balance weight according to claim 1, wherein the reduced section has an outer diameter which is uniform in cross-section around its entire circumference and decreases in said axial direction.

3. A balance weight according to claim 1, wherein the balance weight is made of tin or a tin alloy.

4. A balance weight according to claim 2, wherein the balance weight is made of tin or a tin alloy.

5. A balance-correcting structure for a spoke wheel which comprises a wheel hub into which an axle is inserted, a rim on an outer periphery of which a tire is mounted, and a plurality of spokes connecting the wheel hub and the rim, wherein the spokes are disposed so that the spokes adjacent to each other in a circumferential direction of the rim cross over each other, the structure comprising:
   columnar-shaped balance weights individually mounted to rim-side ends of at least an adjacent two of the spokes to extend in an axial direction of the spokes; and
   each of said balance weights including a reduced section having a decreased outer diameter at an end at which the balance weights are closest to each other in order to avoid contact between the balance weights mounted to the adjacent spokes;
   wherein the reduced section has a length which is approximately one quarter of the entire axial length of the balance weight, and
   wherein the reduced section includes a tapered portion and a substantially cylindrical portion leading to a smaller-diameter end of the tapered portion;
   wherein each of said balance weights comprises a main body portion and a rounded corner portion disposed between the reduced section and the main body portion, and said main body portion has a tapered shape with an outer diameter decreased toward the wheel hub and configured such that a taper of the main body portion is smaller than that of the tapered portion of the reduced section.

6. A balance-correcting structure according to claim 5, wherein the reduced section has an outer diameter which is uniform in cross-section around its entire circumference and decreases in said axial direction.

7. A balance-correcting structure according to claim 5, wherein the balance weights are made of tin or a tin alloy.

* * * * *